United States Patent
Sakai et al.

(10) Patent No.: US 12,202,552 B2
(45) Date of Patent: Jan. 21, 2025

(54) EXTERIOR MEMBER FOR VEHICLE AND METHOD FOR MANUFACTURING THE SAME

(71) Applicants: HAYASHI TELEMPU CORPORATION, Nagoya (JP); TOYOTA JIDOSHA KABUSHIKI KAISHA, Toyota (JP)

(72) Inventors: Kensaku Sakai, Nagoya (JP); Hiroshi Suzuki, Nagoya (JP); Koushi Yamada, Toyota (JP); Motoi Iida, Toyota (JP); Masaru Shirota, Toyota (JP)

(73) Assignees: HAYASHI TELEMPU CORPORATION, Nagoya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 417 days.

(21) Appl. No.: 17/599,227

(22) PCT Filed: Mar. 10, 2020

(86) PCT No.: PCT/JP2020/010277
§ 371 (c)(1),
(2) Date: Sep. 28, 2021

(87) PCT Pub. No.: WO2020/203091
PCT Pub. Date: Oct. 8, 2020

(65) Prior Publication Data
US 2022/0194487 A1    Jun. 23, 2022

(30) Foreign Application Priority Data
Mar. 29, 2019   (JP) ................. 2019-068005

(51) Int. Cl.
B62D 29/04   (2006.01)
B32B 5/02    (2006.01)
(Continued)

(52) U.S. Cl.
CPC ............ *B62D 29/04* (2013.01); *B32B 5/022* (2013.01); *B32B 5/026* (2013.01); *B32B 5/26* (2013.01);
(Continued)

(58) Field of Classification Search
CPC ...... B62D 29/04; B62D 25/161; B62D 25/20; B32B 5/022; B32B 5/026; B32B 5/26;
(Continued)

(56) References Cited

U.S. PATENT DOCUMENTS

2012/0077403 A1* 3/2012 Gaillard ................. D01F 8/04
                                                    977/734
2016/0333510 A1* 11/2016 Bahukudumbi ...... B32B 5/022

FOREIGN PATENT DOCUMENTS

CN   103415416 A    11/2013
JP   1-145649 U     10/1989
(Continued)

OTHER PUBLICATIONS

International Search Report issued on May 19, 2020 in PCT/JP2020/010277 filed Mar. 10, 2020, 2 pages.
Japanese Office Action issued Sep. 6, 2022 in Japanese Patent Application No. 2019-068005 (with English translation), citing document 15 therein. 8 pages.
(Continued)

*Primary Examiner* — Matthew D Matzek
(74) *Attorney, Agent, or Firm* — Oblon, McClelland, Maier & Neustadt, L.L.P.

(57) ABSTRACT

A vehicle exterior member having a self-neutralizing function which can improve running characteristics and steering stability of a vehicle without impairing the design property has a fiber molded member containing a needle-punched nonwoven fabric or knitted fabric. The fibers constituting the fiber molded member contain a conductive fiber.

5 Claims, 1 Drawing Sheet

(51) Int. Cl.
*B32B 5/26* (2006.01)
*B60R 16/06* (2006.01)

(52) U.S. Cl.
CPC ........ *B60R 16/06* (2013.01); *B32B 2260/023* (2013.01); *B32B 2260/046* (2013.01); *B32B 2262/0253* (2013.01); *B32B 2262/0284* (2013.01); *B32B 2262/106* (2013.01); *B32B 2307/202* (2013.01); *B32B 2605/00* (2013.01)

(58) Field of Classification Search
CPC ........ B32B 2260/023; B32B 2260/046; B32B 2262/0253; B32B 2262/0284; B32B 2262/106; B32B 2307/202; B32B 2605/00; B32B 2250/20; B32B 2262/124; B32B 2264/1022; B32B 5/265; B32B 2262/101; B32B 2262/132; B32B 2262/144; B32B 2262/152; B32B 2264/108; B60R 16/06; D04H 1/46
USPC ......... 442/199, 200, 311, 361, 364; 428/373
See application file for complete search history.

(56) References Cited

FOREIGN PATENT DOCUMENTS

| | | | |
|---|---|---|---|
| JP | 2573039 | B2 | 1/1997 |
| JP | 2528917 | Y2 | 3/1997 |
| JP | 2001-180395 | A | 7/2001 |
| JP | 2002104106 | A * | 4/2002 |
| JP | 2006-88880 | A | 4/2006 |
| JP | 2006-240408 | A | 9/2006 |
| JP | 2006-248284 | A | 9/2006 |
| JP | 3145580 | | 10/2008 |
| JP | 3145580 | U | 10/2008 |
| JP | 6168157 | B2 | 7/2017 |
| WO | WO-9101621 | A2 * | 2/1991 |

OTHER PUBLICATIONS

Combined Chinese Office Action and Search Report issued Sep. 15, 2022 in Chinese Patent Application No.

* cited by examiner

EXTERIOR MEMBER FOR VEHICLE AND METHOD FOR MANUFACTURING THE
SAME

TECHNICAL FIELD

The present invention relates to a vehicle exterior member used in a vehicle such as an automobile, and a method of manufacturing the same.

BACKGROUND ART

In a vehicle such as an automobile, it is known that electrostatic charge of a vehicle body affect steering stability or the like [Patent Literature 1]. The vehicle body is generally positively charged by the vehicle moving on a road surface. It is considered that this is because the whole vehicle body is charged by peeling electrification between the road surface and tires, when the vehicle runs on the road surface generally through the tires made of rubber. In addition, since air in the environment is normally positively charged, air flow flowing around the vehicle body when moving is also positively charged. The electrostatically positively charged vehicle body and the positively charged air flow are electrically repelled, and as a result, the air flow flowing along the vehicle body is easily separated from the outer surface of the vehicle body. By separation of the air flow from the outer surface of the vehicle body, it becomes impossible to obtain the intended aerodynamic characteristics in the vehicle, there is a possibility that the running characteristics and the steering stability of the vehicle, etc., are lowered.

Patent Literature 1 discloses a matter that a self-discharge type static eliminator for neutralizing charge elimination of the positive charging on the vehicle body side by self-discharge is provided at a position where separation of the air flow from the vehicle body may occur during moving of the vehicle, thereby preventing the separation of the air flow to improve the running characteristics and steering stability of the vehicle. Positions where separation of the air flow may occur include not only a ceiling (or roof) portion of the vehicle body, but also a surface of an undercover provided on a lower surface of the vehicle body, i.e., a surface facing the road surface side. Patent Literature 1 also discloses use of a coating of a conductive metal, as a self-discharge type static eliminator, which has a sharp or pointed corners to cause self-discharge. As an example, Patent Literature 1 illustrates a conductive aluminum adhesive tape processed with an outer edge portion so as to have sharp or pointed corners. Furthermore, Patent Literature 1 discloses that providing a self-discharge type static eliminator so as to face inside of the vehicle interior is effective to reduce the amount of charge on the ceiling portion of the vehicle body and improve steering stability or the like.

Although Patent Literature 1 discloses a technique for reducing the charging of the vehicle body such as for improving steering stability of the vehicle, there are techniques relating to charge elimination in interior of the vehicle body, for example, those described in Patent Literatures 2 to 5. Patent Literature 2 discloses that, in an interior material in which a skin material is laminated on a base material via a cushion material and which is mounted on an indoor ceiling or the like of an automobile, a conductive fiber is mixed into the skin material, thereby preventing electrostatic charging of the skin material.

Patent Literature 3, as an antistatic mat provided in a vehicle interior in order to remove electrostatic charge of a human body, discloses one having a pile containing conductive fibers.

Patent Literature 4 discloses matters of, in an automobile soundproofing material with an electromagnetic wave control function, incorporating a conductive material into a base material to have a volume resistivity of $10^4$ to $10^7$ Ω·cm, and providing, on a rear surface side of a sound source or an electromagnetic source, a conductive film having a surface resistivity of $10^3 Ω/\square$ or less. The automobile soundproofing member is mounted on the engine side of a undercover of the vehicle body so that it faces the engine, for example.

Patent Literature 5 discloses that, in a sheet surface material of a pile ground for constituting a seat of a vehicle, a conductive fiber having a core-sheath structure in which carbon is contained in a core portion and a sheath portion is made of polyester is mixed into the pile in an amount of 0.01 to 5 mass % in order to prevent electrostatic charging of a person who is seated.

CITATION LIST

Patent Literature

Patent Literature 1: JP 6168157 B2
Patent Literature 2: JP H01-145649 U
Patent Literature 3: JP 2528917 Y2
Patent Literature 4: JP 2001-180395 A
Patent Literature 5: JP 2573039 B2

SUMMARY OF INVENTION

Technical Problem

The self-discharge type static eliminator described in Patent Literature 1 is intended to be attached to an exterior member of the vehicle in order to eliminate charging of the vehicle body. From the viewpoint of manufacturing the vehicle, the self-discharge type static eliminator requires a separate step for mounting it, and thus becomes a factor of increase in cost. Further, since the self-discharge type static eliminator is constituted by an adhesive tape or the like made of, for example, conductive aluminum, there is also a problem that the static eliminator is hardly attached to the design surface of the exterior of the vehicle. Therefore, it is preferable that the exterior member itself constituting the exterior of the vehicle has a charge elimination function by self-discharge.

An object of the present invention is to provide a vehicle exterior member having a charge eliminating capability for improving running characteristics and steering stability of a vehicle, and a manufacturing method thereof.

Solution to Problem

The vehicle exterior member according to the present invention is a vehicle exterior member used in exterior of a vehicle, comprising a fiber molded member including a needle-punched nonwoven fabric or knitted fabric, wherein a conductive fiber is contained in fibers constituting the fiber molded member.

The method of manufacturing a vehicle exterior member is a method for manufacturing a vehicle exterior member used in exterior of a vehicle, the method comprising steps of: forming a skin layer by subjecting a polyethylene terephthalate fiber and a polypropylene fiber containing a conductive fiber to a needle-punching process; laminating the skin layer and a base layer containing a glass fiber mat to form a laminate; and subjecting the laminate to heating and a cold pressing process to form a predetermined shape, wherein a content ratio of the conductive fiber in fibers constituting the skin layer is 0.5 mass % or more but 7.0 mass % or less.

Advantageous Effect of Invention

According to the present invention, since the vehicle exterior member itself is provided with a neutralizing charge elimination capability by self-discharge, it is possible to improve steering stability or the like of the vehicle while suppressing the manufacturing cost of the vehicle, without being restricted in terms of design.

DESCRIPTION OF EMBODIMENTS

Next, an embodiment of the present invention will be described with reference to the drawings. The exterior member according to the present invention is used as an exterior member in a vehicle such as an automobile, and is composed of a fiber molded member. At least a part of the fiber molded member includes a needle-punched nonwoven fabric or a knitted fabric, and a conductive fiber is contained in the fibers constituting the fiber molded member. The exterior member is suitable for constituting a portion which is an outer surface of the vehicle body and faces the road surface. The exterior member can be used as, for example, an undercover provided on the lower surface of the vehicle body, and a fender liner provided in the fender portion of the vehicle body so as to face the tire.

As described above, vehicles such as automobiles which are supported on the road surface via rubber tires are positively charged with running, and the air around the vehicle is also generally positively charged. If the vehicle is provided with the exterior member according to the present invention, since the fiber molded member includes conductive fibers, when the exterior member is electrostatically charged, electric field is concentrated at the ends of the conductive fibers and corona discharge occurs between the surrounding environment and the ends of the conductive fibers. The charge accumulated in the exterior member thus escapes into the atmosphere by the corona discharge, and the exterior member is neutralized. That is, the exterior member will also be provided with a function as a self-discharge type static eliminator, and the exterior member itself is prevented from being positively charged. When the exterior member according to the present invention is used as an undercover of an automobile, it is prevented that the air flow flowing along the undercover between the vehicle body and the road surface is separated from the undercover by the electrostatic repulsion, whereby the air flow below the vehicle body is stabilized to improve the running characteristics and the steering stability of the vehicle.

Figure 1:
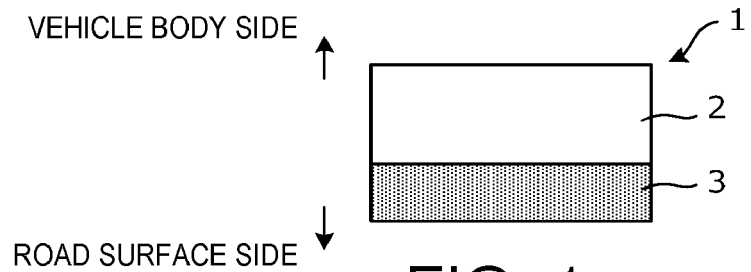
FIG. 1 is a cross-sectional view showing a configuration of an exterior member according to an embodiment of the present invention.

FIG. 1 shows exterior member 1 according to an embodiment of the present invention. This exterior member 1 is a member in which base layer 2 containing fibers and skin layer 3 containing fibers are laminated and integrated. Base layer 2 is made of, for example, a glass fiber mat made of glass fiber and polypropylene (hereinafter, also abbreviated as PP). Skin layer 3 is constituted by a needle-punched nonwoven fabric or a knitted fabric, and a conductive fiber is contained in fibers constituting skin layer 3 in an amount of, for example, 0.5% by mass or more and 7.0% by mass or less. When skin layer 3 is constituted by a knitted fabric, skin layer 3 is formed as a pile knitted fabric or a fabric so that the end of the conductive fiber is exposed to the outside air as much as possible. Since the conductive fiber is contained in skin layer 3, exterior member 1 is attached to the vehicle body so that skin layer 3 is in contact with the air outside the vehicle and the outer air can penetrate to skin layer 3. Since skin layer 3 is provided on one surface of base layer 2 here, when using exterior member 1 as an under cover, exterior member 1 is attached to the lower portion of the vehicle body so that skin layer 3 faces the road surface side and base layer 2 faces the vehicle body side. When using exterior member 1 as a fender liner, exterior member 1 is attached to the fender in the tire house so that skin layer 3 faces the tire side and base layer 2 faces the fender side. However, exterior member 1 according to the present invention is not limited to one in which skin layer 3 is provided on one surface of base layer 2. Skin layers 3 may be provided on both surfaces of base layer 2 so that conductive fibers are contained in both of these skin layers 3. When skin layers 3 are provided on both surfaces of base layer 2, one skin layer 3 is directed toward the road surface side while the other skin layer 3 is directed toward the vehicle body side. Alternatively, in a configuration in which skin layer 3 is provided on one surface of base layer 2, a conductive fiber may be also included in base layer 2 itself which is formed as a glass fiber reinforced mat or the like.

Since skin layer 3 is composed of a nonwoven fabric or a knitted fabric, not only performing static charge elimination of exterior member 1, skin layer 2 has functions of prevention of chipping of the coating film caused by small stones or the like jumping with the vehicle running, noise absorption against running noise, prevention of snow accretion or ice accretion, and the like. Providing a skin layer in addition to a base layer is widely performed for the prevention of chipping and sound absorption of running noise even in the conventional under cover. Therefore, according to the present embodiment, it is possible to improve the steering stability of the vehicle only by mixing the conductive fiber to the nonwoven fabric or knitted fabric constituting the skin layer. As compared with the case of separately attaching the self-discharge type static eliminator made of aluminum tape to an under cover or the like, it is possible to improve steering stability or the like with reduced cost according to the present invention.

Next, the conductive fiber used in the present embodiment will be described. As the conductive fiber, it is preferable to use a fiber having a specific resistance alone, that is, a conductive fiber resistance, of $4\times10$ $\Omega\cdot cm$ or more but $4\times10^2$ $\Omega\cdot cm$ or less. When the conductive fiber resistance is smaller than this range, the charge elimination effect becomes higher, but the cost is significantly increased. On the other hand, if the conductive fiber resistance is too large, the chare elimination effect due to corona discharge is reduced. The conductive fiber is produced, for example, by dissolving a polymer material serving as a raw material of the fiber, adding conductive particles, for example, carbon or titanium oxide, thereto, and then spinning the dissolved polymer. As the conductive fiber, it is also possible to use one that uniformly contains conductive particles regardless of the position in the fiber. However, since a decrease in mechanical strength due to incorporation of conductive particles such as carbon is concerned, it is preferable to use, for example, a conductive fiber having a core-sheath structure or a conductive fiber in which the conductive portion is formed so as to extend in the longitudinal direction of the fiber at a specific position in the circumferential direction at the fiber surface. In a conductive fiber having a core-sheath structure, a polymer material containing conductive particles is disposed in a core portion, and a sheath portion surrounding the core portion is composed only of a polymer material. The sheath portion is a portion which gives properties such as strength and flexibility as a fiber. Corona discharge is generally more prone to the sharper the tip of the conductor, the smaller the diameter of the fiber, and the smaller the electrical resistance of the conductor. On the other hand, if the volume resistivity is the same, the electrical resistance is obviously increased when the diameter of the conductor is small. Therefore, the diameter of the core portion of the conductive fiber having the core-sheath structure is set to, for example, 6 µm or more but 15 µm or less, and the content of carbon in the core portion is set to, for example, 3 mass % or more but 15 mass % or less.

With regard to the conductive fiber mixed into skin layer 3, the shorter the fiber, the number of places per volume where corona discharge can occur increases, and the charge elimination effect is increased. On the other hand, if the fiber length is too short, processing into a nonwoven fabric or a knitted fabric becomes difficult. In consideration of these conditions, the length of the conductive fiber is preferably set to, for example, 25 mm or more but 86 mm or less, and more preferably 25 mm or more but 45 mm or less. The conductive fiber is mixed into polyethylene terephthalate (hereinafter, sometimes abbreviated as PET) fibers or PP fibers, and is processed into a needle-punched nonwoven fabric or a knitted fabric to constitute skin layer 3. Since it is considered that the charge elimination effect is increased as the surface resistivity is lowered, it is preferable that the surface resistivity of the side of skin layer 3 in a state where skin layer 3 is laminated and integrated with base layer 2 to form exterior member 1 is $2\times10^{13}\Omega/\square$ or less.

As an example of the conductive fiber of the core-sheath structure which can be used in this embodiment, there is Corebrid™ B manufactured by Mitsubishi Chemical Corporation. Further, as an example of a conductive fiber in which a conductive portion is formed on the fiber surface so as to extend in the longitudinal direction of the fiber at a specific position in the circumferential direction, there is Clacarbo® KC-585S of Kuraray Co., Ltd.

Next, an example of a method of manufacturing exterior member 1 according to the present embodiment will be explained. Skin layer 3 is formed as a nonwoven fabric by needle-punching PET fiber, and PP fiber containing 0.5 mass % or more and 3.0 mass % or less of the conductive fiber. On the other hand, base layer 2 is formed by performing injection molding of PP in which glass fibers are mixed, i.e., glass fiber mat, for example. Then, base layer 2 and skin layer 3 are laminated to form a laminate, the laminate is heated, and then a cold press working to form a desired shape is performed, whereby base layer 2 and skin layer 3 is integrated and the finished product of exterior member 1 is obtained.

EXAMPLES

The present invention will be next described in more detail by way of Examples and Comparative Examples.

Here, as an exterior member for automobiles, a front under cover which is arranged on the lower side of the engine room and a floor under cover which is arranged below the passenger room portion were manufactured and mounted on an automobile for testing, and the steering stability was evaluated by running the automobile for testing under the state of these under covers being attached. The automobile for testing used for the evaluation of the steering stability was a four-wheel passenger car driven by front wheels. The steering stability was evaluated in four grades from "A" to "D" by the test drivers judging the behavior of the vehicle body or the like when the automobile for testing was driven at a speed of 140 km/h or less on a flat straight test course by two test drivers. "A" indicates that it is remarkably superior to the standard, "B" indicates that it is superior to the standard, "C" indicates that it is equivalent to the standard, and "D" indicates that it is inferior to the standard. The standard was determined by Reference Example described later.

Further, after cutting out a test piece at a size of 45 mm×45 mm from the exterior member, a charge decay rate was determined as the electrostatic properties of the test piece by using a static attenuation measuring instrument (i.e., static honestmeter) MODEL H0110, manufactured by Shishido Electrostatic, Ltd., to measure initial charging voltage and half-life in an ambient of 20° C. and 80% relative humidity. In the measurement, on placing the test piece on a turntable so that the test piece was rotated between an application unit and a receiving unit of the measuring instrument, the surface of the test piece was charged in the application unit by corona discharge of an applied voltage of 10 kV and the charging voltage of the test piece was measured in the receiving unit. The rotational speed of the turntable was set to 1550 revolutions per minute, the clearance in the application unit was set to 20 mm, the clearance in the receiving unit was set to 15 mm. The thickness of the test piece was 2 to 5 mm.

Figure 2:
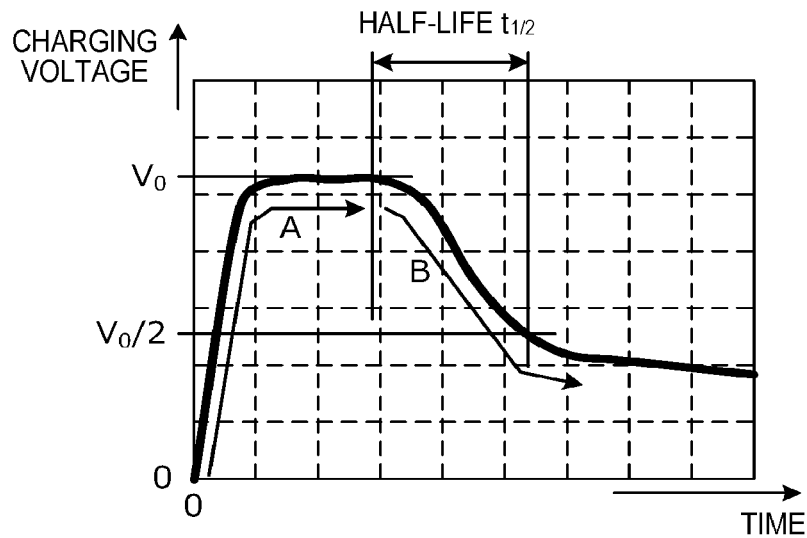
FIG. 2 is a diagram illustrating a measurement method of a charge decay rate.

FIG. 2 is a diagram showing a measurement principle of the charge decay rate. When causing corona discharge in the application unit while rotating the turntable, electric charge is accumulated on the surface of the test piece, the charging voltage due to the accumulated charge is measured in the receiving unit. Since the accumulation of charge progresses over time, the charging voltage gradually increases as shown by "A" in FIG. 2. The charging voltage eventually settles to a constant value. The value of the charging voltage at this time is called the initial charging voltage $V_0$. The initial charging voltage can be considered as the charging voltage of a surface when the surface is charged by corona discharge with an applied voltage of 10 kV at a clearance of 20 mm. When the charging voltage settles to a constant value, corona discharge at the application unit is stopped. Then, as indicated by "B", the charging voltage of the test piece decreases. The time from the termination of corona discharge until the charging voltage of the test piece reaches half of the initial charging voltage, i.e., $V_0/2$, is called the half-life $t_{1/2}$. The charge decay rate c is defined as a value obtained by dividing the voltage dropped during the half-life $t_{1/2}$, i.e., $V_0/2$, by the half-life $t_{1/2}$. The charge decay rate is expressed by equation as follows:

$$c=V_0/(2\times t_{1/2}).$$

Here, five measurements were performed for each test piece to average the results thereby obtaining the charge decay rate c, the initial charging voltage $V_0$ and the half-life $t_{1/2}$ of the test piece.

Reference Example

A front under cover and a floor under cover used as manufacturer's genuine products for the automobile for testing were mounted to the automobile, the evaluation of the steering stability was carried out, and this evaluation was made to be the standard of the evaluation of the steering stability in Examples and Comparative Examples. The front under cover and the floor under cover in the reference example were obtained by using the same material in which base layer 2 and skin layer 3 were integrated by laminating, as shown in FIG. 1. Base layer 2 was one in which two layers of glass fiber mats each of which contained 50 mass % of glass fibers and 50 mass % of PP were laminated. The mass per unit area of the glass fiber mat for each layer was 550 g/m$^2$. As skin layer 3, a needle-punched nonwoven fabric containing 50 mass % of PP fiber, 30 mass % PET fiber and 20 mass % of low-melting-point PET fiber was used. The mass per unit area of skin layer 3 was 200 g/m$^2$. Base layer 2 and skin layer 3 are integrated by performing a cold press after heating. The surface resistivity of the side of skin layer 3 in exterior member 1 could not be measured because it was too high, and the surface resistivity of the side of base layer 2 was $1.68 \times 10^{12} \Omega/\square$.

The charge decay rate was measured using a test piece of the same material as the front under cover and the floor under cover of Reference Example. The measurement of the charge decay rate was performed for each of the surface of the side of base layer 2, i.e., the surface to be a vehicle body side when attached to the vehicle body, and the surface of the side of skin layer 3, i.e., the surface to be a road surface side when attached to the vehicle body. Table 1 shows each of the composition of base layer 2 and the composition of skin layer 3 in mass ratio, and Table 2 shows the evaluation results of the steering stability and the measurement results of the charge decay rate. Incidentally, in Table 2, there is "No decay" in the column of the charge decay rate of the surface of the vehicle body side refers to the case where the charged electric charge hardly changes without decreasing. In this case, the half-life is not defined because the charging voltage does not decay.

Example 1

Exterior member 1 described with reference to FIG. 1 was formed and mounted on the automobile for testing as the front under cover and the floor under cover of the same shape and the same size as those in Reference Example to evaluate the steering stability. In addition, the measurement of the charge decay rate was performed on the test piece cut out from exterior member 1. As base layer 2, the same one as in Reference Example 1 was used, and as skin layer 3, one in which a part of PET fiber was replaced with a conductive fiber so that the content ratio of the conductive fiber was 2% was used, as shown in Table 1. The mass per unit area of skin layer 3 was 200 g/m$^2$ as in Example 1. As the conductive fiber, Corebrid™ B, manufactured by Mitsubishi Chemical Corporation, which has a core-sheath structure with a fiber length of 38 mm, was used. Although the carbon content in the core portion of this conductive fiber is unknown, the conductive fiber resistance is as small as $4.25 \times 10 \Omega/\square$ cm, the diameter of the core portion is about 10 μm, the diameter of the entire fiber is about 20 μm (i.e., 3.3 dtex). Table 2 shows the results. By using the exterior member of Example 1 as the front under cover and the floor under cover, the steering stability was improved as compared with Reference Example. In exterior member 1, the surface resistivity of the side of skin layer 3 was $1.82 \times 10^{13} \Omega/\square$, the surface resistivity of the side of base layer 2 was $3.10 \times 10^9 \Omega/\square$. The volume resistivity of exterior member 1 as a whole was $7.56 \times 10^{12}$ Ω·cm.

Example 2

Except using Clacarbo® KC-585S having a fiber length of 76 mm, manufactured by Kuraray Co., Ltd., as the conductive fiber, exterior member 1 was formed in the same manner as Example 1 and mounted on the automobile for testing as the front under cover and the floor under cover to evaluate the steering stability. The charge decay rate was also measured. The conductive fiber used here is one in which the conductive portion is formed so as to extend in the longitudinal direction of the fiber at four locations in the circumferential direction on the fiber surface, the diameter of the conductive portion is about 4 μm, and the diameter of the entire fiber is about 20 μm (i.e., 3.3 dtex). The conductive fiber resistivity of this conductive fiber is $3.63 \times 10^2$ Ωcm. Table 2 shows the results. It is considered that the conductive fiber used here has larger conductive fiber resistance than that of Example 1, and this resulting in less self-charge elimination by corona discharge. Still, the steering stability was somewhat improved as compared with Reference Example in which the conductive fiber was not contained in skin layer 3. In exterior member 1, the surface resistivity of the side of skin layer 3 was $3.10 \times 10^9 \Omega/\square$, the and surface resistivity of the side of base layer 2 was $2.72 \times 10^{12} \Omega/\square$. The volume resistivity of exterior member 1 as a whole was $7.97 \times 10^{12}$ Ω·cm.

Comparative Example 1

Figure 3:
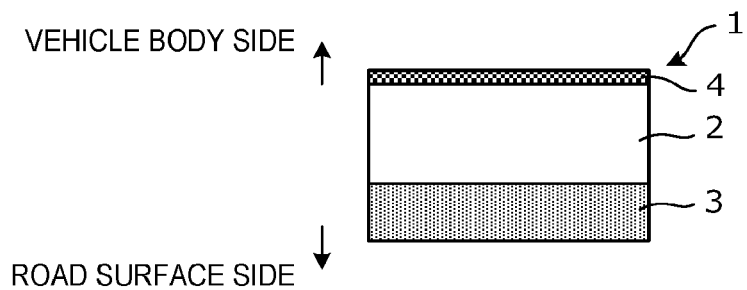
FIG. 3 is a cross-sectional view showing the configuration of the exterior member of Comparative Example 1.

Exterior member 1 shown in FIG. 3 was formed and mounted on the automobile for testing as the front under cover and the floor under cover of the same shape and the same size as those in Reference Example to evaluate the steering stability. In addition, the measurement of the charge decay rate was performed. Exterior member 1 of Comparative Example 1 is one in which, in exterior member 1 shown in FIG. 1, conductive film 4 for antistatic is placed on the surface serving as the vehicle body side of base layer 2. Conductive film 4 is integrated into base layer 2 during the cold pressing for integrating base layer 2 and skin layer 3.

As the conductive film, a film obtained by mixing a product of Entira® AS-series, product number MK400, manufactured by DuPont-Mitsui Polychemical Co., Ltd., at a ratio of 25 mass % and a low melting point PET resin at a ratio of 75 mass %, and forming the mixture into a film was used. Table 2 shows the results. The steering stability was worse than that of Reference Example, which was the standard.

TABLE 1

| | Composition of base layer (mass %) | | Composition of skin layer (mass %) | | | | |
|---|---|---|---|---|---|---|---|
| | Glass fiber | PP | PP fiber | PET fiber | Low melting point PET fiber | Conductive fiber | Structure |
| Reference Example | 50 | 50 | 50 | 30 | 20 | 0 | FIG. 1 |
| Example 1 | 50 | 50 | 50 | 28 | 20 | 2 | FIG. 1 |
| Example 2 | 50 | 50 | 50 | 28 | 20 | 2 | FIG. 1 |
| Comparative Example 1 | 50 | 50 | 50 | 30 | 20 | 0 | FIG. 3 |

TABLE 2

| | | Surface of road surface side | | | Surface of vehicle body side | | |
|---|---|---|---|---|---|---|---|
| | Steering Stability | Charge decay rate [-kV/s] | Initial charging voltage [-kV] | Half-life [s] | Charge decay rate [-kV/s] | Initial charging voltage [-kV] | Half-life [s] |
| Reference Example | Standard | 0.023 | 1.00 | 21.7 | No decay | 0.036 | — |
| Example 1 | A | 0.103 | 0.50 | 2.4 | No decay | 0.08 | — |
| Example 2 | B | 0.027 | 0.51 | 9.4 | No decay | 0.11 | — |
| Comparative Example 1 | D | 0.021 | 1.14 | 26.9 | 0.001 | 0.12 | 64.8 |

From the above results, it is found that the steering stability is improved when an exterior member is used as an under cover of an automobile, the exterior member being a vehicle exterior member which has a fiber molded body containing a needle-punched nonwoven fabric or a knitted fabric and in which a conductive fiber is included in the fibers constituting the fiber molded body, and that the running characteristics are improved accordingly. It is considered that this is because corona discharge occurs at the end of the conductive fiber thereby performing charge elimination of the self-discharge type. In addition, as is evident from the results shown in Table 2, there is a correlation between the steering stability and the charge decay rate on the surface of the exterior member on the road surface side, and the steering stability was better as the charge decay rate was larger. Since the charge decay rate in Reference Example is 0.023 kV/sec, it is understood that in exterior member 1 in which base layer 2 and skin layer 3 are laminated and integrated, it is preferable that the charge decay rate on the side of the skin layer exceeds 0.023 kV/sec. Including the conductive fiber lowered the initial charging voltage. It is considered that inclusion of the conductive fiber prevents separation of the air flow and contributes to improvement in the steering stability. On the other hand, no correlation is found between the charge decay rate of the surface of the exterior member on the vehicle body side and the initial charging voltage or the steering stability. In Comparative Example 1, the steering stability was rather deteriorate. It is considered that this is because the conductive film is provided on the entire surface of the vehicle body side in exterior member 1, so that the positive charge accumulated in the vehicle body is widely distributed on the surface of the road surface side of exterior member 1, electrostatic repulsion between the air flow flowing under the vehicle body and exterior member 1 is increased as the positive charge is distributed wider, and then the separation of the air flow is likely to occur.

With regard to the volume resistivity as a whole of exterior member 1, while the values of Examples 1 and 2 were $7.56 \times 10^{12}$ Ω·cm and $7.97 \times 10^{12}$ Ω·cm, respectively, the value in Reference Example in which conductive fiber is not contained becomes a larger value than Examples 1 and 2, and, in Comparative Example 1, it becomes a larger value than Reference example 1. If the shapes of the tips of the conductive fibers are the same, it is considered that the charge eliminating capacity becomes larger as the volume resistivity is smaller, and therefore, considering the evaluation results of the steering stability, it can be seen that the volume resistivity as a whole of exterior member 1 is preferably $8 \times 10^{12}$ Ω·cm or less.

REFERENCE SIGNS LIST

1 Exterior member;
2 Base layer;
3 Skin layer; and
4 Conductive film.

What is claimed is:
1. A vehicle exterior member used in an exterior of a vehicle, comprising:
   a base layer containing fibers; and
   a skin layer containing fibers,
   wherein the base layer and the skin layer are laminated and integrated to constituting a fiber molded member including a needle-punched nonwoven fabric or knitted fabric,
   wherein a conductive fiber is contained 0.5 mass % or more but 7.0 mass % or less in the fibers constituting the skin layer, and the base layer is free of the conductive fiber, wherein the vehicle exterior member is configured to be attached to a vehicle body of the vehicle so that the skin layer faces a road-surface side, wherein a fiber length of the conductive fiber is 25 mm or more but 86 mm or less, and wherein a surface resistivity of a side of the skin layer is $2\times10^{13}$ Ω/square or less.

2. The vehicle exterior member according to claim 1, wherein, when a charging voltage of a surface of the skin layer when the surface of the skin layer is charged by corona discharge with an applied voltage of 10 kV at a clearance of 20 mm is defined as an initial charging voltage, and a time until the charging voltage of the surface of the skin layer becomes ½ of the initial charging voltage after stop of the the corona discharge is defined as a half-life, a charge decay rate which is a value obtained by dividing ½ of the initial charging voltage by the half-life exceeds 0.23 kV/sec.

3. The vehicle exterior member according to claim 1, wherein the conductive fiber is a fiber having a core-sheath structure, conductivity is added to a core portion of the core-sheath structure, and a diameter of the core portion is 6 μm or more but 15 μm or less.

4. The vehicle exterior member according to claim 2, wherein the conductive fiber is a fiber having a core-sheath structure, conductivity is added to a core portion of the core-sheath structure, and a diameter of the core portion is 6 μm or more but 15 μm or less.

5. The vehicle exterior member according to claim 1, wherein the base layer contains a glass fiber mat.

\* \* \* \* \*